United States Patent Office 3,404,181
Patented Oct. 1, 1968

3,404,181
PRODUCTION OF CYCLODODECANONE OXIME
Horst Metzger, Ludwigshafen (Rhine), Germany, assignor to Badische Anilin- & Soda-Fabrik Aktiengesellschaft, Ludwigshafen (Rhine), Germany
No Drawing. Filed July 29, 1963, Ser. No. 298,471
Claims priority, application Germany, Aug. 4, 1962, B 68,311
1 Claim. (Cl. 260—566)

This invention relates to a new process for the production of cyclododecanone oxime or its hydrochloride. More specifically the invention relates to such a process in which a new initial material is used.

It is known that cyclododecanone oxime can be prepared by reaction of cyclododecanone with hydroxylamine (Helv. Chim. Acta, 32 (1949), 549; French patent specification No. 1,248,252). Cyclododecanone is however not a readily accessible substance and must in fact be prepared by quite troublesome methods some of which are expensive and protracted. Moreover these methods often give only moderate yields with a low conversion and lead to products which do not satisfy modern high requirements as to purity.

Specifically, the following methods are known:

Acyloin condensation of dodecane-diacid-(1,12) esters, conversion of the acyloin into cyclododecanone by reduction with zinc;

Reaction of cyclododecatriene-(1,5,9) with per-acids, hydrogenation of the epoxycyclododecadiene to the epoxycyclododecane and isomerization of the same to cyclododecanone;

Nitration of cyclododecane and conversion of the nitrocyclododecane into cyclododecanone by means of sulfuric acid;

Oxidation of cyclododecane by means of oxygen or oxygen-containing gases and dehydrogenation of the cyclododecanol, which is formed at the same time, to cyclododecanone;

Hydration of difficulty accessible cyclododecene by means of aqueous sulfuric acid and dehydrogenation of the cyclododecanol to cyclododecanone.

Processes for the production of cyclododecanone oxime which do not proceed via cyclododecanone are also known. Thus nitrocyclododecane can be catalytically hydrogenated to cyclododecanone oxime. This method does not operate sufficiently selectively however and has therefore not achieved any industrial importance. Moreover nitration of cyclododecane to nitrocyclododecane does not proceed satisfactorily. Furthermore it is known that cyclododecane may be reacted with nitrosyl chloride or nitrogen monoxide and chlorine with exposure to light to form cyclododecanone oxime. Cyclododecanone oxime is thus obtained in good yields. Of course it is necessary to use light quanta in the method in at least stoichiometric amounts. This involves a relatively high power consumption which is further increased by the fact that the bulk of the energy consumed by the light source is given off in the form of heat which is not used for the reaction and must be abstracted by cooling. Moreover the necessity for providing apparatus having light-transmitting portions causes difficulty in translation into a commercial scale.

It is an object of this invention to provide a process by which cyclododecanone oxime or its hydrochloride can be prepared from a readily accessible substance. It is another object of the invention to provide a process which leads to products which satisfy high purity requirements. It is a further object of the invention to provide a process which leads to cyclododecanone oxime or its hydrochloride with high selectivity and in good yields. Other objects and advantages will be evident from the following description.

In accordance with this invention, the said objects and advantages are achieved by the hydrogenation of 2-chlorocyclododecanone-(1)-oxime or the corresponding compounds which are olefinically unsaturated once or twice in the presence of a precious metal of group VIII of the periodic system of elements as catalyst. The product is the hydrochloride of cyclododecanone oxime and the free oxime may be obtained therefrom if desired.

Surprisingly only chlorine is removed from the initial materials and only olefinic double linkages are hydrogenated in the process according to this invention. On the other hand the C=N double linkage in the oxime group which normally is easily reducible is not attacked under the process conditions. In fact it would have been expected that cyclododecylamine or its hydrochloride would be formed. Under comparable conditions, cyclooctylamine is obtained from α-chlorocyclooctanone oxime (U.S. patent specification No. 2,907,793).

The hitherto unknown initial materials of the process according to the invention may be prepared by reaction of cyclododecatriene-(1,5,9), cyclododecadiene-(1,5) and/or cyclododecene with nitrosyl chloride in the presence of hydrogen chloride at a temperature between —50° C. and +50° C. By cyclododecatriene-(1,5,9) we mean mainly the trans,trans,trans-isomer, the trans,trans,cis-isomer, the trans,cis,cis-isomer and mixtures of these compounds. All reaction products obtained from cyclododecatrienes and nitrosyl chloride which have been obtained in the presence of hydrogen chloride are suitable as initial materials for the process according to this invention and in spite of the possibility of isomerism they are referred to simply as 2-chlorocyclododecadiene-(5,9)-one-(1)-oxime. Similarly it is without important whether the starting material is cis,trans- or trans,trans-cyclododecadiene-(1,5). The reaction product is called 2-chlorocyclododecene-(5)-one-(1)-oxime. The two geometric isomers of cyclododecene also give equally good results.

Instead of nitrosyl chloride it is possible to use nitrogen monoxide and chlorine and also substances which are equivalent to nitrosyl chloride and which yield nitrosyl chloride, such as dinitrogen trioxide and hydrogen chloride or nitrosylsulfuric acid and hydrogen chloride. The twelve-membered cyclic hydrocarbon and the nitrosyl chloride are advantageously used in equimolar amounts. It is remarkable that reaction takes place only at one double linkage even when the twelve-membered cyclic hydrocarbon has more than one double linkage and even when an excess of nitrosyl chloride is used.

It is important that hydrogen chloride should be coemployed, because otherwise the isomeric bis-α-chloronitroso compounds are formed almost exclusively (U.S. patent specification No. 3,076,038). This should be avoided if possible because it is known that α-chloronitroso compounds are converted by reduction into amines (see, for example, Bull. Vol. 1949, pp. 578–690; Compt. Rend. Vol. 234 (1952), p. 2618; Soc. Vol. 1951, p. 24). It is therefore recommendable to saturate the twelve-membered cyclic hydrocarbon or its solution with hydrogen chloride prior to the action of nitrosyl chloride and also to supply hydrogen chloride continuously during the reaction at a rate such that the solution remains saturated with hydrogen chloride. It is remarkable that in spite of the presence of hydrogen chloride it is the free α-chloroxime which is formed and not its hydrochloride.

The initial materials for the process are advantageously prepared in the presence of an inert solvent. Examples of suitable inert solvents are chlorohydrocarbons, such as methylene chloride, chloroform or carbon tetrachloride, and also saturated aliphatic, saturated cycloaliphatic and aromatic hydrocarbons, such as n-heptane, cyclohexane, benzene or toluene. When working without solvents it is recommendable to use an excess of the $C_{12}$-hydrocarbon which then functions as a solvent.

The α-chloroximes may be recovered from the reaction mixture by evaporation of the solvent or excess initial material and may if desired be purified by crystallization, for example from ethyl acetate.

It is not necessary to start from α-chloroximes in substance. On the contrary it is also possible to hydrogenate direct the reaction mixture obtained by the said reaction of cyclododecatriene-(1,5,9), cyclododecadiene-(1,5) or cyclododecene with nitrosyl chloride without previous isolation of the α-chloroxime. The hydrogen chloride may be previously removed. This may be achieved by expelling it by means of an inert gas. For example hydrogen may be used for this purpose. It is recycled and freed from hydrogen chloride at a suitable point by washing.

Obviously it is also possible to use 2-chlorocyclododecanone oximes which have been prepared by other methods.

Palladium is preferred from among the precious metals of group VIII of the periodic system because it is the most selective. It is also possible to achieve good results with the other precious metals of group VIII, such as platinum, but the formation of cyclododecylamine is avoided with the greatest certainty when using palladium. The catalyst is advantageously colloidally dispersed or used in some other large-surfaced form. For example catalysts may be used in which the precious metal has been deposited on inert carriers, such as aluminum oxide, active carbon, barium sulfate, calcium sulfate or silicates. The amount of catalyst depends on the temperature, the pressure, the catalyst itself and the initial material to be hydrogenated and in a batchwise process is usually between 0.01 and 5% by weight of precious metal with reference to the initial material. The most favorable amount may readily be ascertained by preliminary experiment.

The process according to the invention is carried out using molecular hydrogen which may be diluted by inert gases, such as nitrogen. It is possible to work at atmospheric pressure or at increased pressure for example up to 200 atmospheres gauge. It is also possible to work at still higher pressures, for example at 500 atmospheres, but this is not attended by any particular advantage.

The reaction temperature is preferably between 0° and 130° C. At lower temperatures the hydrogenation proceeds rather sluggishly whereas at above 130° C. decomposition of the initial material occurs.

The process is advantageously carried out in the presence of a solvent which is inert under the reaction conditions. Examples of suitable solvents are lower alcohols, ethers, lower carboxylic acids or their esters, aliphatic, cycloaliphatic or aromatic hydrocarbons. Specific examples are methanol, butanol, diethyl ether, tetrahydrofurane, dioxane, acetic acid, ethyl acetate, petroleum ether, n-heptane, cyclohexane, benzene and toluene.

The coemployment of weak bases for the removal of hydrogen chloride is possible in principle, but caution is necessary because α-chloroximes readily react otherwise with excess of bases so that the yield of cyclododecanone oxime is decreased.

The process according to the invention may be carried out continuously or batchwise. For example a solution of the initial materials may be treated with hydrogen in the presence of the catalyst at the reaction temperature until the calculated amount of hydrogen has been absorbed. At this point, or shortly before it, the absorption of hydrogen usually ceases completely or at least becomes considerably slower. The cyclododecanone oxime formed remains dissolved in most cases so that the catalyst, possibly while still hot, may be separated by filtering, decanting or siphoning off the liquid phase. The catalyst may be used for a fresh batch. The solvent is then wholly or partly evaporated from the liquid phase, if necessary under subatmospheric pressure, until cyclododecanone oxime hydrochloride remains or crystallizes out. If desired the free cyclododecanone oxime, which is practically insoluble in water or dilute acid, can be prepared by conventional methods from the hydrochloride. This is achieved most simply by adding water, the hydrochloride thus being hydrolyzed. If the solvent used is miscible with water, the solution which has been separated from the catalyst may be merely diluted, when the free cyclododecanone oxime will separate while any small amounts of cyclododecylamine formed will as a rule remain in solution as the hydrochloride. The solvent may be recovered by distilling the dilute aqueous solution.

In another embodiment of the process according to this invention, a solvent is used which is immiscible or only slightly miscible with strong acids or medium strength acids and the cyclododecanone oxime hydrochloride is separated by extraction of the reaction mixture with such an acid, such as 85% phosphoric acid or 80 to 100% sulfuric acid. The cyclododecanone oxime in the mineral acid solution may then be rearranged direct to laurolactam. It is also possible however to precipitate the free oxime by dilution with water.

The invention will be further illustrated by the following examples in which the parts specified are by weight unless otherwise stated. Parts by weight bear the same relation to parts by volume as the g. to the ccm.

Example 1

23 parts of 2-chlorocyclododecadiene-(5,9)-one-(1)-oxime having a melting point of 132° C. (infrared band for oximes at 6.0 microns, no nitroso bands; bands for a cis- and trans-C—C— linkage at 14.14 and 10.3 microns; Liebermann's nitroso reaction negative prepared by simultaneously passing in hydrogen chloride and one equivalent of nitrosyl chloride into a solution saturated with hydrogen chloride of trans,trans,cis-cyclododecatriene (1,5,9) in tetrachloromethane at —10° C., distilling off the solvent and recrystallizing the residue from ethyl acetate) is dissolved in 70 parts of methanol, then 3 parts of a catalyst containing 5% of palladium on aluminum oxide is added and the whole treated at room temperature and at atmospheric pressure with hydrogen while stirring. The temperature in the vessel rises somewhat by reason of the hydrogenation heat liberated. After 7200 parts by volume of hydrogen has been absorbed, the reaction practically ceases even if the tempreature is raised to 60° C. The catalyst is filtered off and the reaction mixture is poured into 200 parts of water. Crystals separate and are filtered off, washed with water and dried. In this way 18 parts (91% of the theory) of crude cyclododecanone oxime is obtained; with an authentic product it exhibits no melting point depression, after sublimation under subatmospheric pressure it melts at 133° C. and also exhibits all other properties of cyclododecanone oxime.

0.9 part (5% of the theory) of cyclodedecylamine is obtained as a residue by adding caustic soda to the strongly acid methanol-aqueous mother liquor until it has a weakly alkaline reaction, extracting this solution with ether and distilling off the ether.

By following an analogous procedure but using a 2-chlorocyclododecadiene-(5,9)-one-(1)-oxime having a melting pont of 103° C. which has been prepared by the action of nitrosyl chloride in the presence of hydrogen chloride on trans, trans, trans-cyclododecatriene-(1,5,9) (infrared band for oximes at 6.0 microns, no nitroso bands, Liebermann reaction negative), 18 parts of cyclododecanone oxime (91% of the theory) is again obtained.

By using 1 part of 2% palladium on carbon as the catalyst, 18.2 parts of cyclododecanone oxime (92% of the theory) is obtained.

Example 2

23 parts of 2-chlorocyclododecanone oxime (infrared band for oximes at 6.0 microns, no nitroso bands, Libermann reaction negative; melting point 151° C.; prepared by the action of 1 mole of nitrosyl chloride in the presence of hydrogen chloride on a solution of 1 mole of cyclododecene (mixture of cis, trans-isomers) in cyclohexane, removal of the solvent under subatmospheric pressure and recrystallization of the residue from ethyl actate) is dissolved in 50 parts of methanol and hydrogenated at 50° C. with the addition of 2 parts of a catalyst containing 5% by weight of palladium on barium sulfate.

The reaction practically ceases when 2400 parts by volume of hydrogen has been absorbed. The mixture is allowed to cool, the catalyst is filtered off and the solution is poured into 200 parts of water. The deposited, practically colorless crystals, are filtered off by suction, washed with water and dried. 17.8 parts (90% of the theory) of crude cyclododecanone oxime having a melting point of 125° C. is obtained which after recrystallization from ethyl acetate melts at 133° C.

Cyclododecanone oxime is also obtained by working under the same conditions but using 100 parts of dioxane and using as the catalyst 0.1 part of platinum oxide according to Adams (which is reduced to platinum under the reaction conditions).

Example 3

A solution of 81 parts of cyclododecatriene-(1,5,9) (commercial mixture of trans,trans,trans- and trans,trans, cis-isomers) in 300 parts of methanol is saturated with hydrogen chloride and then while stirring 33 parts of nitrosyl chloride is passed in during the course of two and one half hours, the supply of hydrogen chloride being maintained. The temperature is about −5° to −10° C. After the reaction is over, half of the methanol and part of the hydrogen chloride are removed under subatmospheric pressure, 3 parts of a catalyst containing 5% by weight of palladium on barium sulfate is added to the residue and hydrogen under a pressure of 0.2 atmosphere gauge is passed in at 50° C. The gas space of the reactor is flushed with hydrogen from time to time to remove accumulated hydrogen chloride. Hydrogenation is continued until the absorption of hydrogen finally becomes extremely slow, which is the case after 35,500 parts by volume of hydrogen has been supplied. The catalyst is separated off by filtration and the solution is poured into 1000 parts of water. The yellow crystals which are deposited are filtered off by suction and sublimed under subatmospheric pressure. 82.5 parts of colorless cyclododecanone oxime having a melting point of 133° C. is obtained. The yield is 83% of the theory with reference to cyclododecatriene-(1,5,9).

Example 4

23 parts of 2-chlorocyclododecadiene-(5,9)-one-(1)-oxime having a melting point of 132° C. is dissolved in 50 parts of methanol and hydrogenated in the presence of 2 parts of a catalyst containing 2% by weight of palladium on aluminum oxide in an autoclave at room temperature under a hydrogen pressure of 200 atmospheres gauge. When the absorption of hydrogen becomes very slow, the catalyst is filtered off and the further procedure described in Example 1 is followed. The yield of cyclododecanone oxime is 17.6 parts (89% of the theory).

Example 5

The procedure of Example 1 is followed but 0.05 part of palladium more (finely divided platinum metal) is used; cyclododecanone oxime is obtained in a yield of 90% of the theory.

I claim:
1. A process for preparing cyclododecanone oxime comprising reacting 2-chlorocyclododecanone oxime with hydrogen in the presence of hydrogen chloride, a palladium hydrogenation catalyst and an inert solvent, and separating cyclododecanone oxime from the reaction mixture.

References Cited

UNITED STATES PATENTS

| 2,420,382 | 5/1947 | Robertson | 260—566 |
| 3,078,306 | 2/1963 | Von Schickh et al. | 260—566 |

FOREIGN PATENTS

| 139,317 | 7/1961 | U.S.S.R. | |

FLOYD D. HIGEL, *Primary Examiner.*